US010179987B2

(12) United States Patent
Kawasaki et al.

(10) Patent No.: US 10,179,987 B2
(45) Date of Patent: Jan. 15, 2019

(54) CONTROL SYSTEM FOR HYBRID CONSTRUCTION MACHINE (71) Applicant: KYB Corporation, Tokyo (JP)

(72) Inventors: Haruhiko Kawasaki, Kanagawa (JP); Masahiro Egawa, Saitama (JP)

(73) Assignee: KYB Corporation, Tokyo (JP)

( * ) Notice: Subject to any disclaimer, the term of this patent is extended or adjusted under 35 U.S.C. 154(b) by 367 days.

(21) Appl. No.: 14/917,723

(22) PCT Filed: Sep. 26, 2014

(86) PCT No.: PCT/JP2014/075588
§ 371 (c)(1),
(2) Date: Mar. 9, 2016

(87) PCT Pub. No.: WO2015/053094
PCT Pub. Date: Apr. 16, 2015

(65) Prior Publication Data
US 2016/0215481 A1 Jul. 28, 2016

(30) Foreign Application Priority Data
Oct. 11, 2013 (JP) .................. 2013-213961

(51) Int. Cl.
E02F 9/22 (2006.01)
F15B 20/00 (2006.01)
(Continued)

(52) U.S. Cl.
CPC .......... *E02F 9/2217* (2013.01); *E02F 9/2075* (2013.01); *E02F 9/2203* (2013.01);
(Continued)

(58) Field of Classification Search
CPC ..... E02F 9/2217; E02F 9/2075; E02F 9/2203; E02F 9/2282; E02F 9/2285; E02F 9/2292; E02F 9/2296; F15B 15/20; F15B 21/14
(Continued)

(56) References Cited

U.S. PATENT DOCUMENTS 3,947,744 A * 3/1976 Grace .................. F15B 21/14
290/50
5,442,912 A * 8/1995 Hirata .................. E02F 9/2221
60/426

(Continued)

FOREIGN PATENT DOCUMENTS

JP 2011-179541 A 9/2011
WO WO 2011105436 A1 * 9/2011 ............ E02F 9/2217

*Primary Examiner* — Nathaniel E Wiehe
*Assistant Examiner* — Richard C Drake
(74) *Attorney, Agent, or Firm* — Rabin & Berdo, P.C.

(57) ABSTRACT

A control system for a hybrid construction machine includes first and second main pumps for supplying working oil, a boom cylinder extending by supply of the working oil to a piston-side chamber and raising a boom and contracting by discharge of the working oil from the piston-side chamber and lowering the boom, a regenerative spool valve controlled by a pressure of pilot pressure oil and adjusting a flow rate of the working oil discharged from the piston-side chamber, a regenerative motor for regeneration rotating by the working oil discharged from the piston-side chamber, a rotary electric machine connected to the regenerative motor, and a failsafe switching valve switching with a pressure of a regenerative passage between the regenerative control spool valve and the regenerative motor as a pilot pressure and lowering the pressure of the pilot pressure oil to the regenerative control spool valve so that a flow rate of the working oil discharged from the piston-side chamber is narrowed if the pressure of the regenerative passage is less than a set pressure.

7 Claims, 2 Drawing Sheets (51) Int. Cl.
*F15B 21/14* (2006.01)
*H02K 7/18* (2006.01)
*E02F 9/20* (2006.01)

(52) U.S. Cl.
CPC .......... *E02F 9/2282* (2013.01); *E02F 9/2285* (2013.01); *E02F 9/2292* (2013.01); *E02F 9/2296* (2013.01); *F15B 20/004* (2013.01); *F15B 21/14* (2013.01); *H02K 7/1823* (2013.01); *F15B 2211/20515* (2013.01); *F15B 2211/20523* (2013.01); *F15B 2211/20546* (2013.01); *F15B 2211/20576* (2013.01); *F15B 2211/3058* (2013.01); *F15B 2211/30595* (2013.01); *F15B 2211/329* (2013.01); *F15B 2211/355* (2013.01); *F15B 2211/45* (2013.01); *F15B 2211/67* (2013.01); *F15B 2211/7053* (2013.01); *F15B 2211/7142* (2013.01); *F15B 2211/761* (2013.01); *F15B 2211/8752* (2013.01); *F15B 2211/88* (2013.01)

(58) Field of Classification Search
USPC ...... 60/325, 414, 419, 420, 445; 701/22, 50; 91/461
See application file for complete search history.

(56) References Cited

U.S. PATENT DOCUMENTS

| | | | | |
|---|---|---|---|---|
| 5,477,677 A * | 12/1995 | Krnavek | ............... | E02F 9/2217 60/414 |
| 6,253,658 B1 | 7/2001 | Kimura | | |
| 6,378,301 B2 * | 4/2002 | Endo | ..................... | E02F 9/2217 60/414 |
| 6,460,332 B1 * | 10/2002 | Maruta | ................. | E02F 9/2075 60/414 |
| 7,530,434 B2 * | 5/2009 | Bitter | .................... | B66F 9/0655 188/151 R |
| 7,634,911 B2 * | 12/2009 | Brinkman | ............ | E02F 9/2075 60/414 |
| 8,510,000 B2 * | 8/2013 | Kawasaki | ............ | E02F 9/2075 180/275 |
| 8,606,452 B2 * | 12/2013 | Kawasaki | ............ | E02F 9/2075 701/22 |
| 8,659,177 B2 * | 2/2014 | Fujishima | ............ | E02F 9/2217 290/1 R |
| 8,720,196 B2 * | 5/2014 | Kawasaki | ............ | E02F 9/2075 60/422 |
| 8,806,860 B2 * | 8/2014 | Kawasaki | ............ | E02F 9/2075 251/282 |
| 8,833,065 B2 * | 9/2014 | Kawasaki | ............ | E02F 9/2075 60/414 |
| 8,966,890 B2 * | 3/2015 | Mather | ................... | F15B 7/001 60/421 |
| 9,037,357 B2 * | 5/2015 | Kawasaki | ............ | E02F 9/2075 701/50 |
| 9,080,582 B2 * | 7/2015 | Fukuda | .................... | E02F 9/123 |
| 9,200,430 B2 * | 12/2015 | Kawasaki | ............ | E02F 9/2217 |
| 9,476,437 B2 * | 10/2016 | Egawa | .................... | F15B 21/14 |
| 9,835,187 B2 * | 12/2017 | Egawa | .................... | F15B 21/14 |
| 9,920,502 B2 * | 3/2018 | Kawasaki | ............ | E02F 9/123 |
| 2011/0268588 A1 * | 11/2011 | Kawasaki | ............ | E02F 9/2075 417/213 |
| 2012/0304630 A1 | 12/2012 | Kawasaki et al. | | |
| 2014/0366951 A1 * | 12/2014 | Vigholm | ............ | E02F 9/2217 137/14 |

* cited by examiner

CONTROL SYSTEM FOR HYBRID CONSTRUCTION MACHINE

TECHNICAL FIELD

The present invention relates to a control system for a hybrid construction machine with a regenerative device for regenerating energy utilizing working fluid introduced from an actuator.

BACKGROUND ART

As a prior-art hybrid construction machine, those performing energy regenerations by rotating a hydraulic motor using working oil led from a hydraulic cylinder is known.

JP2011-179541A discloses a hybrid construction machine provided with a boom cylinder vertically rotating a boom. In this hybrid construction machine, a hybrid motor is rotated by using working oil returned from the boom cylinder when the boom is lowered, and a power generator is driven by a rotating torque of the hydraulic motor.

SUMMARY OF INVENTION

However, with the hybrid construction machine described in JP2011-179541A, if a pressure of the working oil led from the boom cylinder to the hydraulic motor lowers for some reason, there is a concern that a rotating speed when the boom is lowered might become faster than a speed intended by an operator.

The present invention has an object to improve fail safe performances when a load is lowered.

According to an aspect of the present invention, a control system for a hybrid construction machine, includes a fluid pressure pump configured to supply a working fluid; a fluid pressure cylinder configured to extend by supply of the working fluid to a load-side pressure chamber and raising the load, the fluid pressure cylinder being configured to contract by discharge of the working fluid from the load-side pressure chamber and lowering the load; a regenerative flow-rate control valve controlled by a pressure of a pilot fluid, the regenerative flow-rate control valve being configured to adjust a flow rate of the working fluid discharged from the load-side pressure chamber; a regenerative motor for regeneration configured to be rotated by the working fluid discharged from the load-side pressure chamber; a rotary electric machine connected to the regenerative motor; and a failsafe switching valve configured to be switched a pressure of a regenerative passage between the regenerative flow-rate control valve and the regenerative motor as a pilot pressure and if the pressure of the regenerative passage is less than a set pressure, the pressure of the pilot fluid to the regenerative flow-rate control valve is lowered so that the flow rate of the working fluid discharged from the load-side pressure chamber is narrowed.

DESCRIPTION OF EMBODIMENTS

A control system for a hybrid construction machine according to embodiments of the present invention will be described below by referring to the attached drawings.

In each of the embodiments below, a case in which the hybrid construction machine is a hydraulic excavator will be described. Moreover, in each of the embodiments below, a load is a boom of the hydraulic excavator, and a fluid-pressure cylinder is a boom cylinder BC for elevating up/down the boom.

(First Embodiment)

A control system 100 for a hybrid construction machine according to a first embodiment of the present invention will be described below by referring to FIG. 1.

Figure 1:
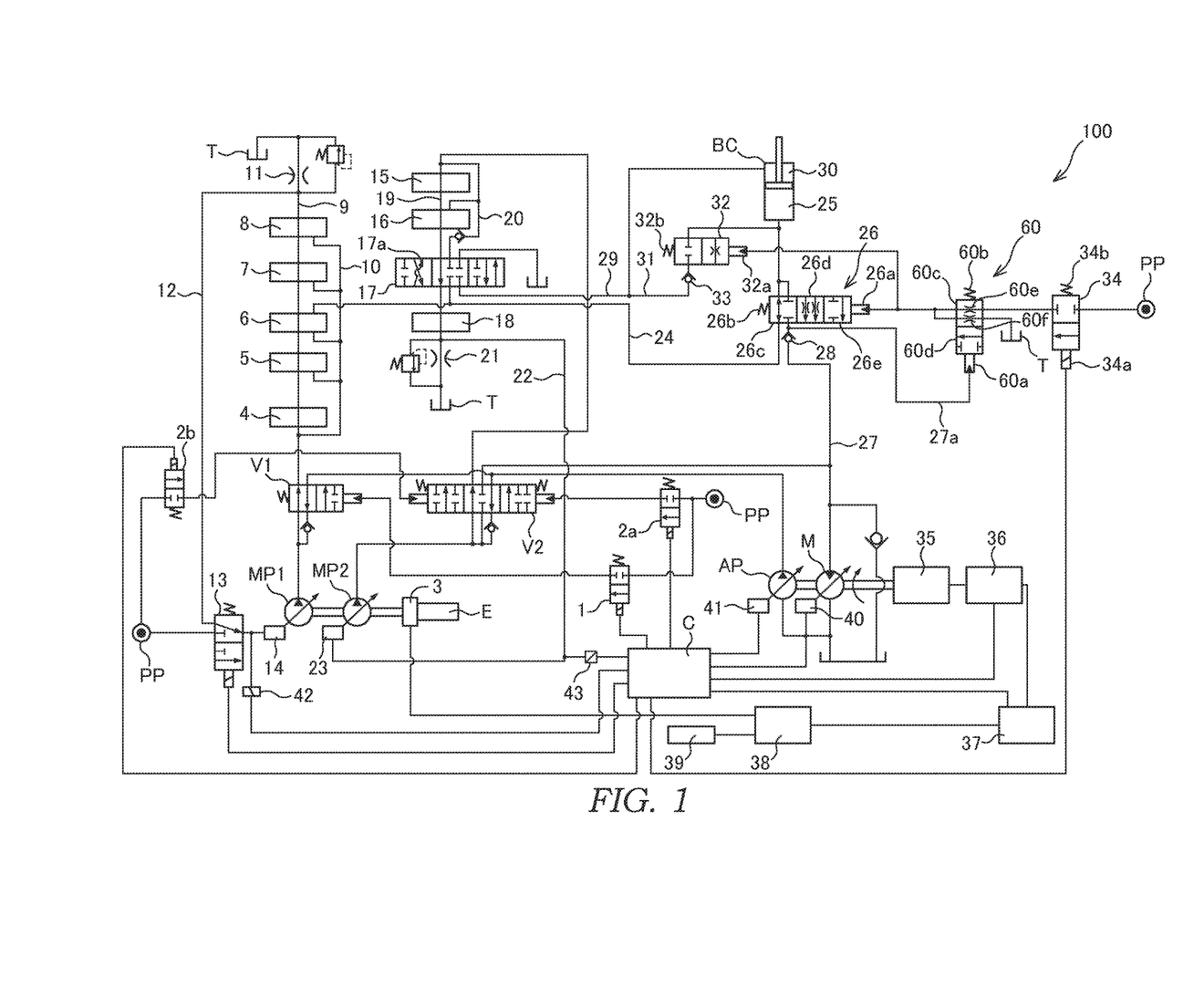
FIG. 1 is a circuit diagram illustrating a control system for a hybrid construction machine according to a first embodiment of the present invention.

As illustrated in FIG. 1, the control system 100 of the hybrid construction machine includes a variable capacity type first main pump MP1, a variable capacity type second main pump MP2, and a variable capacity type assist pump AP.

A discharge port of the first main pump MP1 is connected to a first circuit system through a first switching valve V1. A discharge port of the second main pump MP2 is connected to a second circuit system through a second switching valve V2. A discharge port of the assist pump AP can merge with the discharge port of the first main pump MP1 through the first switching valve V1 and also can merge with the discharge port of the second main pump MP2 through the second switching valve V2. The first main pump MP1, the second main pump MP2, and the assist pump AP are fluid-pressure pumps for pressurizing/supplying working oil (working fluid).

The first switching valve V1 is a spool type switching valve with 4 ports and 2 positions. The first switching valve V1 has a pilot chamber provided facing one end of a spool, and the other end of the spool is supported by a spring. The first switching valve V1 is held at a normal position by an urging force of the spring in a state in which a pilot pressure is not supplied to the pilot chamber (state illustrated in FIG. 1).

The first switching valve V1 supplies discharge oil of the first main pump MP1 to the first circuit system and also merges the discharge oil of the assist pump AP with the discharge port of the first main pump MP1 through a check valve.

When the first switching valve V1 is switched to a switching position (right-side position in FIG. 1) by the pilot pressure of the pilot chamber, merging of the discharge oil of the assist pump AP with the discharge port of the first main pump MP1 is shut off. At this time, the discharge oil of the first main pump MP1 is continuously supplied to the first circuit system.

The second switching valve V2 is a spool type switching valve with 6 ports and 3 positions. In the second switching valve V2, pilot chambers are provided facing the both ends of the spool, respectively. The spool is supported in a neutral state by a pair of centering springs provided on the both ends, respectively. The second switching valve V2 is usually held at the normal position (state illustrated in FIG. 1) by the spring force of the centering springs.

The second switching valve V2 supplies the discharge oil of the second main pump MP2 to the second circuit system and also merges the discharge oil of the assist pump AP with the discharge port of the second main pump MP2 in a state held at the normal position.

When the second switching valve V2 is switched to a first switching position (right-side position in FIG. 1) by the pilot pressure in one of the pilot chambers, the merging of the discharge oil of the assist pump AP with the discharge port of the second main pump MP2 is shut off. At this time, the discharge oil of the second main pump MP2 is continuously supplied to the second circuit supply system.

When the second switching valve V2 is switched to a second switching position (left-side position in FIG. 1) by the pilot pressure of the other pilot chamber, merging of the discharge oil of the assist pump AP with the discharge port of the second main pump MP2 and supply of the discharge oil of the second main pump MP2 to the second circuit supply system are both shut off.

At this time, the discharge oil of the second main pump MP2 is supplied to a regenerative motor M driving the assist pump AP. At the normal position and the first switching position, supply of the discharge oil of the second main pump MP2 to the hydraulic motor M is shut off.

To the pilot chamber of the first switching valve V1, a pilot pressure is supplied from a pilot hydraulic source PP through an electromagnetic valve 1. The electromagnetic valve 1 shuts off the pilot chamber from the pilot hydraulic source PP (state illustrated in FIG. 1) when a solenoid is at a non-excited normal position. The electromagnetic valve 1 is switched to a communication position (lower position in FIG. 1) where the discharge oil of the pilot hydraulic pressure PP is supplied to the pilot chamber by excitation of the solenoids.

One of the pilot chambers of the second switching valve V2 is connected to the pilot hydraulic source PP through an electromagnetic valve 2a. The other pilot chamber of the second switching valve V2 is connected to the pilot hydraulic source PP through an electromagnetic valve 2b. The electromagnetic valves 2a and 2b shut off the pilot chamber from the pilot hydraulic source PP when the solenoid is at the non-excited normal position (state illustrated in FIG. 1). The electromagnetic valve 2a and the electromagnetic valve 2b are switched to the communication positions where the discharge oil of the pilot hydraulic source PP is supplied to the pilot chamber by excitation of the solenoids.

Each of the solenoids of the electromagnetic valve 1, the electromagnetic valve 2a, and the electromagnetic valve 2b is connected to a controller C.

The controller C is constituted by a microcomputer including a central processing unit (CPU), a read only memory (ROM), a random access memory (RAM), and an input/output interface (I/O interface). The controller C can be constituted not by a single microcomputer but by a plurality of microcomputers.

The controller C makes each of the solenoids of the electromagnetic valve 1, the electromagnetic valve 2a, and the electromagnetic valve 2b excited or non-excited in accordance with an input signal from an operator of the hybrid construction machine.

The first main pump MP1 and the second main pump MP2 are rotated/driven by an engine E including a rotation speed sensor (not shown). The engine E is attached with a power generator 3 for generating power by using an extra torque.

In the first circuit system connected to the first main pump MP1, a switching valve 4 for controlling a turning motor, a switching valve 5 for controlling an arm cylinder, a switching valve 6 for boom 2 speeds for controlling a boom cylinder BC, a switching valve 7 for controlling a spare attachment, and a switching valve 8 for controlling a motor for left running are provided from an upstream side. The switching valves 4 to 8 are connected to each other through a neutral passage 9 and a parallel passage 10 and are connected to the first main pump MP1 through the first switching valve V1.

On a downstream of the switching valve 8 for the left running motor in the neutral passage 9, an orifice 11 for pilot pressure control for generating a pilot pressure is provided. The orifice 11 generates a high pilot pressure on an upstream side if a flow rate is large or generates a low pilot pressure on the upstream side if a flow rate is small.

Specifically, when the switching valves 4 to 8 are at the neutral position or in the vicinity of the neutral position, the neutral passage 9 leads the whole of or a part of the working oil supplied from the first main pump MP1 to the first circuit system to a tank T through the orifice 11. At this time, since a flow rate of the working oil passing through the orifice 11 becomes large, a high pilot pressure is generated.

On the other hand, if the switching valves 4 to 8 are switched to a full stroke state, there is no longer communication of the fluid in the neutral passage 9. In this case, since there is no flow rate of the working oil through the orifice 11, the pilot pressure becomes zero. Depending on operation amounts of the switching valves 4 to 8, a part of the working oil is led to an actuator, while the remaining is led from the neutral passage 9 to the tank T. Thus, the orifice 11 generates a pilot pressure according to the flow rate of the working oil flowing through the neutral passage 9. As described above, the orifice 11 generates a pilot pressure according to the operation amounts of the switching valves 4 to 8 located on the upstream side.

Between the switching valve 8 and the orifice 11 in the neutral passage 9, a pilot passage 12 is connected. The pilot passage 12 is connected to a regulator 14 for controlling a tilt angle of a swash plate of the first main pump MP1 through an electromagnetic switching valve 13.

The electromagnetic valve 13 is a valve for supplying the pilot pressure to the regulator 14. The electromagnetic switching valve 13 connects a pilot pressure source selected from the pilot passage 12 and the pilot hydraulic source PP to the regulator 14 in accordance with its position. The electromagnetic switching valve 13 supplies a pressure of the pilot passage 12 as a pilot pressure to the regulator 14 at the normal position (state illustrated in FIG. 1). The electromagnetic switching valve 13 is switched to a switching position (lower position in FIG. 1) when having received supply of an excitation current, and supplies the pressure of the pilot hydraulic pressure source PP as the pilot pressure to the regulator 14.

The solenoid of the electromagnetic valve 13 is connected to the controller C. The controller C supplies an excitation current to the electromagnetic switching valve 13 and switches it to the switching position in accordance with the input signal from the operator of the hybrid construction machine. On the other hand, the controller C keeps the solenoid non-excited and holds the electromagnetic switching valve 13 at the normal position unless the signal is inputted by the operator.

The regulator 14 executes control such that the tilt angle of the swash plate of the first main pump MP1 is in proportion to the pilot pressure (a proportionality constant is a negative number) and sets a working oil discharge amount per rotation of the first main pump MP1.

When all the switching valves 4 to 8 are maintained at the normal position, that is, when the turning motor, the arm cylinder, the boom cylinder BC, the spare attachment, and the left running motor are not operated, the electromagnetic switching valve 13 plays a role to make the discharge amount of the first main pump MP1 smaller than the other cases. A warming-up operation in which energy loss is to be reduced corresponds to this condition, for example.

In the second circuit system connected to the second main pump MP2, a switching valve 15 for controlling a right running motor, a switching valve 16 for controlling a bucket cylinder, a boom switching valve 17 for controlling the boom cylinder BC, and a switching valve 18 for arm 2 speeds for controlling the arm cylinder are provided from an upstream side. The switching valves 15 to 18 are connected to each other through a neutral passage 19 and are connected to the second main pump MP2 through the second switching valve V2. Moreover, the switching valve 16 and the boom switching valve 17 are connected to each other through a parallel passage 20.

On the downstream side of the switching valve 18 for arm 2 speeds in the neutral passage 19, an orifice 21 for pilot pressure control for generating a pilot pressure is provided. The orifice 21 supplies a pressure on the upstream side as a pilot pressure to a regulator 23 of the second main pump MP2 through a pilot passage 22. Since the orifice 21 functions similarly to the orifice 11, detailed description is omitted here.

The regulator 23 executes control such that the tilt angle of the swash plate of the second main pump MP2 is in proportion to the pilot pressure (a proportionality constant is a negative number) and sets a working oil discharge amount per rotation of the second main pump MP2.

The boom cylinder BC has a piston having a piston-side chamber (load-side pressure chamber) 25 and a rod-side chamber (anti-load side pressure chamber) 30 defined therein and a piston rod connecting the piston and the boom. The boom cylinder BC erects (raises) the boom by extending by supply of the working oil to the piston-side chamber 25 and falls down (lowers) the boom by contracting by discharge of the working oil from the piston-side chamber 25.

The boom switching valve 17 is a spool type switching valve with 6 ports and 3 positions. The boom switching valve 17 has a port connected to the central passage 19, a port connected to the parallel passage 20, and a port connected to the tank T as input ports. Moreover, the boom switching valve 17 has a pair of actuator ports and a port connected to the neutral passage 19 as output ports.

One of the pair of actuator ports is connected to the piston-side chamber 25 of the boom cylinder BC through a passage 24. The other of the pair of actuator ports is connected to the rod-side chamber 30 of the boom cylinder BC through a passage 29.

Three positions of the boom switching valve 17 are a neutral position, a lowered position, and a raised position. These three positions are selected by an operation of the operator of the hybrid construction machine.

The boom switching valve 17 supplies the discharge oil of the second main pump MP2 supplied through the neutral passage 19 to the neutral passage 19 on the downstream side and brings the pair of actuator ports in a shut-off state at the neutral position (state illustrated in FIG. 1). In this state, both of the piston-side chamber 25 and the rod-side chamber 30 in the boom cylinder BC are brought into a sealed state. Thus, the boom is held at a current angular position.

The boom switching valve 17 supplies the discharge oil of the second main pump MP2 supplied through the parallel passage 20 to a rod-side chamber 30 and recirculates the working oil of the piston-side chamber 25 to the tank T through a bleed passage 17a at the lowered position (left-side position in FIG. 1). As a result, the boom cylinder BC contracts and falls down (lowers) the boom.

The boom switching valve 17 supplies the discharge oil of the second main pump MP2 supplied through the parallel passage 20 to the piston-side chamber 25 and recirculates the working oil of the rod-side chamber 30 to the tank T at the raised position (right-side position in FIG. 1). As a result, the boom cylinder BC extends and erects (raises) the boom.

In the passage 24 having one of the actuator ports of the boom switching valve 17 and the piston-side chamber 25, a regenerative control spool valve 26 as a regenerative flow-rate control valve is provided. The regenerative control spool valve 26 is controlled by a pressure of pilot pressure oil (pilot fluid) and adjusts a flow rate of the working oil discharged from the piston-side chamber 25. The regenerative control spool valve 26 has a pilot chamber 26a facing one of the spools and a spring 26b elastically supporting the other of the spool.

The regenerative control spool valve 26 has a normal position 26c at which the working oil of the piston-side chamber 25 is not discharged to the regenerative motor M, an orifice position 26d at which the flow rate of the working oil of the piston-side chamber 25 is narrowed and discharged to the regenerative motor M, and a discharge position 26e at which the working oil of the piston-side chamber 25 is discharged to the regenerative motor M as it is.

The regenerative control spool valve 26 holds the normal position 26c by a sprig force of the spring 26b in a state in which the pilot pressure is not supplied to the pilot chamber 26a (state illustrated in FIG. 1). When the pilot pressure is supplied to the pilot chamber 26a, the regenerative control spool valve 26 is switched to the orifice position 26d and then, it is switched to the discharge position 26e, when the pilot pressure further rises from there.

The regenerative control spool valve 26 allows the passage 24 to communicate in a state maintained at the normal position 26c and shuts off a regenerative passage 27 connecting the piston-side chamber 25 of the boom cylinder BC and the regenerative motor M.

When the position is switched to the orifice position 26d, the regenerative control spool valve 26 narrows the working oil discharged from the piston-side chamber 25 of the boom cylinder BC to the passage 24 and also narrows the working oil discharged to the regenerative passage 27.

When the position is switched to the discharge position 26e, the regenerative control spool valve 26 shuts off the passage 24 and also fully opens the regenerative passage 27. As a result, connection between the piston-side chamber 25 and one of the actuator ports of the boom switching valve 17 is shut off, and the piston-side chamber 25 and the regenerative passage 27 are connected.

The three positions are illustrated for facilitation of understanding, but not only that these positions are alternatively applied but the regenerative control spool valve 26 has a function of holding the passage 24 and the regenerative passage 27 in a partial communication state in accordance with the pilot pressure of the pilot chamber 26a and of controlling their opening degrees in accordance with the pilot pressure.

In the regenerative passage 27, a check valve 28 for allowing a flow of the working oil discharged from the piston-side chamber 25 of the boom cylinder BC to the regenerative motor M and prevents a flow in the opposite direction is provided.

The passage 24 communicating with the piston-side chamber 25 of the boom cylinder BC and the passage 29 communicating with the rod-side chamber 30 of the boom cylinder BC are connected through a regeneration passage 31 in which a regeneration flow-rate control valve 32 is provided. The regeneration flow-rate control valve 32 is constituted by a spool valve. The regeneration flow-rate control valve 32 includes a pilot chamber 32a facing one end of the spool and a spring 32b elastically supporting the other end of the spool.

The regeneration flow-rate control valve 32 is switched by the pilot pressure oil switching the regenerative control spool valve 26 and leads a part of the working oil led from the piston-side chamber 25 of the boom cylinder BC to the tank T in lowering of the boom to the rod-side chamber 30 of the boom cylinder BC as a regeneration flow rate. As described above, by leading and regenerating the part of the working oil of the piston-side chamber 25 to the rod-side chamber 30 in lowering of the boom, a pressure of the rod-side chamber 30 is suppressed from turning to negative even if a lowering speed of the boom cylinder BC becomes faster, and occurrence of a noise can be prevented.

The regeneration flow-rate control valve 32 shuts off the regeneration passage 31 at the normal position at which the pilot pressure is not supplied to the pilot chamber 32a (state illustrated in FIG. 1). On the other hand, the regeneration flow-rate control valve 32 controls a flow rate of the regeneration passage 31 as a variable orifice responding to the pilot pressure at the switching position (right-side position in FIG. 1) at which the pilot pressure is supplied to the pilot chamber 32a.

A spring force of the spring 32b of the regeneration flow-rate control valve 32 is set larger than the spring force of the spring 26b of the regenerative control spool valve 26. Thus, timing at which the regeneration flow-rate control valve 32 allows the regeneration passage 31 to communicate with respect to the same pilot pressure is set to be later than the timing at which the regenerative control spool valve 26 is switched to the orifice position 26d.

In the regeneration passage 31, a check valve 33 for allowing a flow of the working oil from the piston-side chamber 25 to the passage 29 and prevents the flow in the opposite direction is provided.

To the pilot chamber 26a of the regenerative control spool valve 26 and the pilot chamber 32a of the regeneration flow-rate control valve 32, the pilot hydraulic source PP is connected through a proportional electromagnetic valve 34 and a failsafe switching valve 60.

The proportional electromagnetic valve 34 includes a solenoid 34a and a spring 34b for elastically supporting a valve element. The solenoid 34a is excited by a current from the controller C and drives the valve element against the spring 34b.

The proportional electromagnetic valve 34 holds the normal position by the spring force of the spring 34b in a state in which the solenoid 34a is not excited (state illustrated in FIG. 1). The proportional electromagnetic valve 34 is switched to the switching position when the excitation current is supplied from the controller C to the solenoid 34a and connects the pilot chamber 26a and the pilot chamber 32a to the pilot hydraulic source PP at opening degrees according to the excitation current. As described above, the pilot pressures of the pilot chamber 26a and the pilot chamber 32a are controlled to a pressure according to the excitation current supplied from the controller C to the proportional electromagnetic valve 34.

The failsafe switching valve 60 switches the pressure of a regenerative passage 27a between the regenerative control spool valve 26 and the regenerative motor M as a pilot pressure. The failsafe switching valve 60 includes a pilot chamber 60a and a spring 60b elastically supporting the valve element. The pilot chamber 60a is connected to the regenerative passage 27a between the regenerative control spool valve 26 and the check valve 28.

By providing the check valve 28, the pressure of the regenerative passage 27 is not transmitted to the regenerative passage 27a in the other times of regenerative operation (standby regeneration of V2 in FIG. 1, turning regenerative operation, not shown, for example), and the failsafe switching valve 60 is not automatically switched. If the check valve 28 is not provided, for example, the failsafe switching valve 60 is switched to a communication position 60d which will be described later when the standby regeneration changes to boom regeneration. Thus, there is a concern that the pressure from the pilot hydraulic source PP is rapidly applied to the pilot chamber 26a when the proportional electromagnetic valve 34 is switched.

The failsafe switching valve 60 has a bleed orifice position 60c at which a part of the pilot pressure oil supplied to the regenerative control spool valve 26 is recirculated to the tank T and its pressure is reduced and the communication position 60d at which a full amount of the pilot pressure oil is supplied to the regenerative control spool valve 26 if the pressure of the regenerative passage 27a is at a set pressure or more.

When the failsafe switching valve 60 is switched to the communication position 60d, it supplies the pilot pressure oil supplied from the pilot hydraulic source PP through the proportional electromagnetic valve 34 to the pilot chamber 26a and the pilot chamber 32a as it is and shuts off the communication with the tank T. Thus, all the pilot pressure oil supplied from the pilot hydraulic source PP is supplied to the pilot chamber 26a and the pilot chamber 32a.

When the failsafe switching valve 60 is switched to the bleed orifice position 60c, it supplies the pilot pressure oil supplied from the pilot hydraulic source PP through the proportional electromagnetic valve 34 to the pilot chamber 26a and the pilot chamber 32a through a first orifice 60e and also discharges a part of the supplied pilot pressure oil to the tank T through a second orifice 60f. As described above, the failsafe switching valve 60 forms a bleed circuit in a state switched to the bleed orifice position 60c.

If the pressure of the regenerative passage 27a is less than the set pressure, the failsafe switching valve 60 is switched to the bleed orifice position 60c and lowers the pressure of the pilot pressure oil to the regenerative control spool valve 26. As a result, a flow rate of the working oil discharged from the piston-side chamber 25 of the boom cylinder BC is narrowed. Hereinafter, an operation when the boom is lowered will be specifically described.

When the operator of the hybrid construction machine switches the boom switching valve 17 to the lowered position, the discharge oil of the second main pump MP2 is supplied to the rod-side chamber 30, and the working oil of the piston-side chamber 25 is discharged. At this time, the controller C switches the proportional electromagnetic valve 34 to the switching position and starts a regenerative operation by the regenerative motor M.

When the proportional electromagnetic valve 34 is switched by the current from the controller C to the switching position, the pilot pressure oil from the pilot hydraulic source PP is supplied to the pilot chamber 26a and the pilot chamber 32a through the failsafe switching valve 60. At this time, since the failsafe switching valve 60 has been switched to the bleed orifice position 60c, the pilot pressure is reduced and supplied to the pilot chamber 26a of the regenerative control spool valve 26.

If the pilot pressure supplied to the pilot chamber 26a is getting high, the regenerative control spool valve 26 is switched from the normal position 26c to the orifice position 26d. As a result, the working oil of the piston-side chamber 25 of the boom cylinder BC is discharged to the regenerative passage 27 and is led to the regenerative motor M. If the pressure of the regenerative passage 27a gets high by this flow of the working oil, the pilot pressure supplied to the pilot chamber 60a gets high. Thus, the failsafe switching valve 60 is switched from the bleed orifice position 60c to the communication position 60d.

When the failsafe switching valve 60 is switched to the communication position 6od, the pilot pressure supplied to the pilot chamber 26a of the regenerative control spool valve 26 gets high. As a result, the regenerative control spool valve 26 is switched from the orifice position 26d to the discharge position 26e. Thus, a regenerative amount of the regenerative motor M accompanied by lowering of the boom increases.

Here, if the failsafe switching valve 60 is not provided, if the pressure of the regenerative passage 27 lowers for some reason during the regenerative operation, there is a concern that the speed when the boom is lowering might become faster than the speed intended by the operator.

On the other hand, in the control system 100 of the hybrid construction machine, if the pressure of the regenerative passage 27a lowers to less than a set pressure, the pilot pressure supplied to the pilot chamber 60a of the failsafe switching valve 60 also lowers. Thus, the failsafe switching valve 60 is switched from the communication position 60d to the bleed orifice position 60c.

As a result, the pilot pressure with a reduced pressure is supplied to the pilot chamber 26a of the regenerative control spool valve 26. Thus, the pilot pressure supplied to the pilot chamber 26a lowers, and the regenerative control spool valve 26 is switched from the discharge position 26e to the orifice position 26d. Thus, since the flow rate of the working oil discharged from the piston-side chamber 25 of the boom cylinder BC and led to the regenerative motor M is narrowed, the increase in the speed when the boom lowers can be suppressed. Therefore, failsafe performances when the boom is lowered can be improved.

Depending on the operation amount of the boom switching valve 17 by the operator of the hybrid construction machine, it is possible not only to largely limit the flow rate of the working oil discharged from the piston-side chamber 25 and led to the regenerative motor M by intensity of the excitation current of the proportional electromagnetic valve 34 but also to shut off the working oil of the regenerative passage 27 by switching the regenerative control spool valve 26 from the orifice position 26d to the normal position 26c.

Moreover, when the failsafe switching valve 60 is switched from the communication position 60d to the bleed orifice position 60c, the pilot pressure supplied to the pilot chamber 32a of the regeneration flow-rate control valve 32 also lowers. Thus, the regeneration flow-rate control valve 32 is switched from the switching position to the normal position. Thus, the flow rate of the working oil regenerated from the piston-side chamber 25 to the rod-side chamber 30 is also largely limited or shut off. Therefore, the failsafe performance in lowering of the boom can be further improved.

The regenerative motor M is connected to a rotary electric machine 35 which is an electric motor and power generator and integrally rotates coaxially with the assist pump AP. The rotary electric machine 35 is connected to the regenerative motor M and is rotated/driven by the regenerative motor M so as to exert a power generation function. The power generated by the rotary electric machine 35 is charged in a battery 37 through an inverter 36. The battery 37 is connected to the controller C, and a signal indicating an electric storage amount of the battery 37 is inputted into the controller C.

The battery 37 is attached with a battery charger 38. The battery charger 38 charges the battery 37 by using power generated by the power generator 3. A power supply 39 of another system such as a household power supply can be also connected to the battery charger 38.

The regenerative motor M is rotated by the working oil discharged from the piston-side chamber 25 and regenerate power. The regenerative motor M is of a variable capacity type and includes a regulator 40 for controlling a tilt angle of a swash plate. The regulator 40 changes the tilt angle of the swash plate of the regenerative motor M in accordance with the signal from the controller C.

The assist pump AP is also of a variable capacity type and includes a regulator 41 for controlling a tilt angle of a swash plate. The regulator 41 changes the tilt angle of the swash plate of the assist pump AP in accordance with the signal from the controller C.

By means of the above-described constitution, if the regenerative motor M rotates and drives the rotary electric machine 35, the tilt angle of the swash plate of the assist pump AP can be minimized so that a driving load of the assist pump AP hardly acts on the regenerative motor M. If the rotary electric machine 35 is to function as an electric motor, the assist pump AP can be rotated/driven by an output torque of the rotary electric machine 35 and a driving torque of the regenerative motor M so that the assist pump AP functions as a pump.

In the control system 100 of the hybrid construction machine constituted as above, by operating the engine E in a state in which the electromagnetic valve 1, the electromagnetic valve 2a, and the electromagnetic valve 2b are non-excited, the first switching valve V1 and the second switching valve V2 are held at the normal positions, respectively, the working oil is supplied from the first main pump MP1 to the first circuit system, while the working oil is supplied from the second main pump MP2 to the second circuit system.

At the same time, if the working oil is discharged from the assist pump AP, the discharged oil from the assist pump AP is merged with the discharged oil of the first main pump MP1 and the second main pump MP2 and supplied to the first circuit system and the second circuit system.

In order to operate the assist pump AP, it is necessary to operate the rotary electric machine 35 as an electric motor by power of the battery 37 and to rotate the assist pump AP by its rotating torque. In that case, it is preferable that, in the regenerative motor M, the tilt angle of the swash plate is minimized so as to make rotation resistance small and to minimize an output loss of the rotary electric machine 35 functioning as an electric motor. It is possible to rotate/drive the assist pump AP by a rotating force of the regenerative motor M.

The control system 100 of the hybrid construction machine includes a pressure sensor 42 for detecting a pressure supplied to the regulator 14 of the first main pump MP1 and a pressure sensor 43 for detecting a pressure supplied to the regulator 23 of the second main pump MP2. Pressure signals of the pressure sensor 42 and the pressure sensor 43 are inputted into the controller C.

The controller C controls the tilt angle of the swash plate of the assist pump AP in accordance with the pressure signals inputted from the pressure sensor 42 and the pressure sensor 43. A relationship between the pressure signals of the pressure sensors 42 as well as the pressure sensor 43 and the tilt angle of the swash plate of the assist pump AP is set in advance so that the most efficient assist output can be obtained.

On the other hand, if the first switching valve V1 is switched to the switched position, only the discharge oil of the first main pump MP1 is supplied to the first circuit system. If the second switching valve V2 is switched to the first switching position only the discharge oil of the second main pump MP2 is supplied to the second circuit system.

If the second switching valve V2 is switched to the second switching position, the discharge oil of the second main pump MP2 is supplied to the regenerative motor M. Therefore, if the controller C switches the second switching valve V2 to the second switching position through the electromagnetic valve 2b when the actuators connected to the second circuit system are not operated, the regenerative motor M is rotated, and the rotary electric machine 35 can be made to generate power. The power generated by the rotary electric machine 35 is charged in the battery 37 through the inverter 36.

When the regenerative motor M is to rotate/drive the rotary electric machine 35, the tilt angle of the swash plate of the assist pump AP is preferably kept minimum in order to improve power generation efficiency.

The controller C has a function of detecting an electric storage amount of the battery 37 and of controlling the rotation number of the regenerative motor M in accordance with the electric storage amount.

According to the above-described first embodiment, the following effects are exerted.

In the control system 100 of the hybrid construction machine, if the pressure of the regenerative passage 27 between the piston-side chamber 25 of the boom cylinder BC and the regenerative motor M lowers to less than a set pressure for some reason, the failsafe switching valve 60 is switched, the pressure of the pilot pressure oil to the regenerative control spool valve 26 is lowered, and the flow rate of the working oil discharged from the piston-side chamber 25 is narrowed. Thus, an increase of the rotating speed when the boom is lowered can be suppressed. Therefore, the failsafe performance in lowering of the boom can be improved.

Moreover, when the failsafe switching valve 60 is switched from the communication position 60d to the bleed orifice position 60c, the pilot pressure supplied to the pilot chamber 32a of the regeneration flow-rate control valve 32 also lowers. Thus, the regeneration flow-rate control valve 32 is switched from the switching position to the normal position. Thus, the flow rate of the working oil regenerated from the piston-side chamber 25 to the rod-side chamber 30 is largely limited or shut off. Therefore, the failsafe performance when the boom is lowered can be further improved.

(Second Embodiment)

Figure 2:
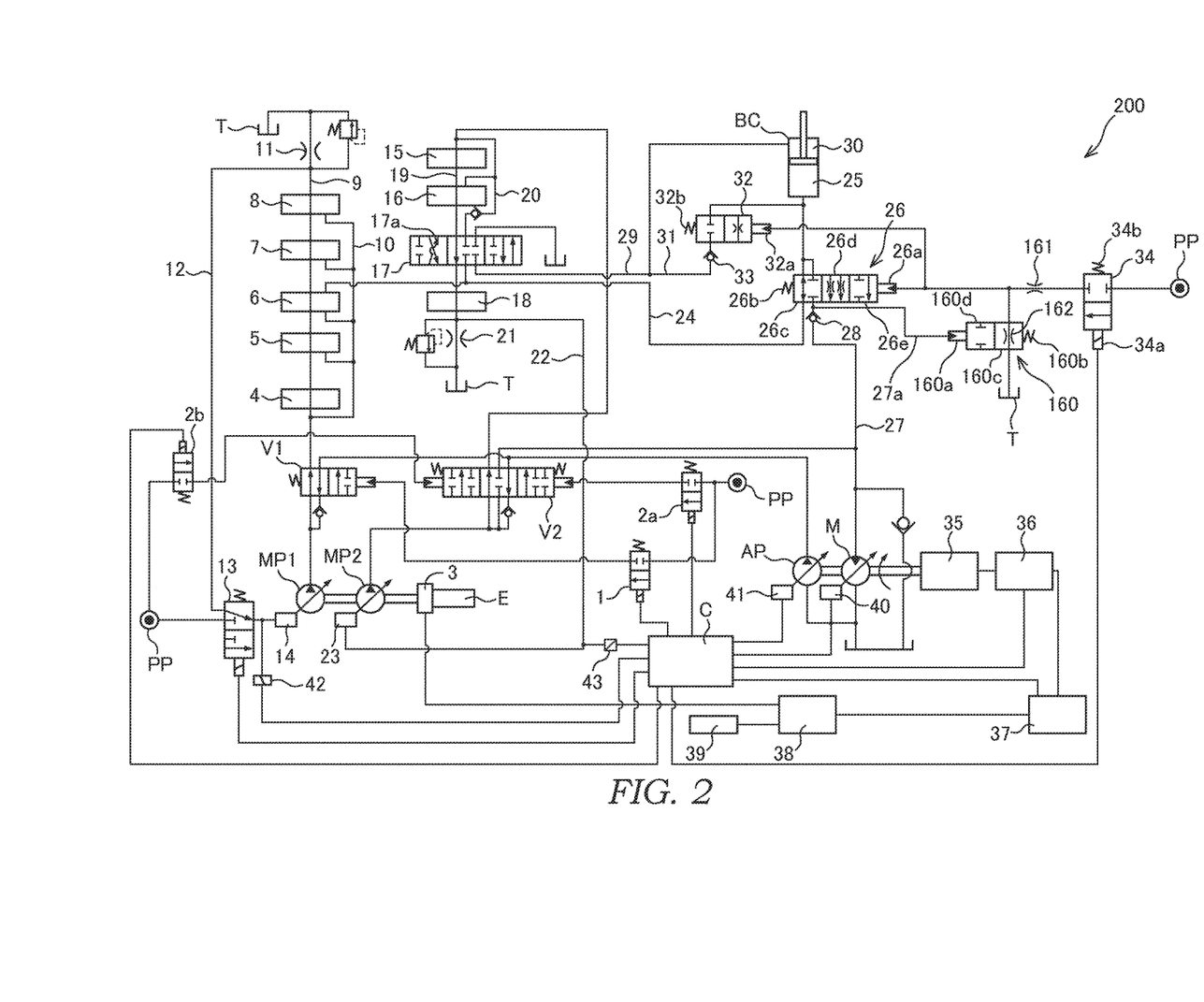
FIG. 2 is a circuit diagram illustrating a control system for a hybrid construction machine according to a second embodiment of the present invention.

A control system 200 for a hybrid construction machine according to a second embodiment of the present invention will be described below by referring to FIG. 2. In the second embodiment illustrated below will be described mainly on a point different from the above-described first embodiment, and the same reference numerals are given to the configurations having the same function as those in the first embodiment and the description will be omitted.

The control system 200 for a hybrid construction machine is different from the first embodiment in a point that a failsafe switching valve 160 is used instead of the failsafe switching valve 60.

The failsafe switching valve 160 is provided at an end branching from a pilot passage between the proportional electromagnetic valve 34 and the pilot chambers 26a and 32a. The failsafe switching valve 160 is switched by the pressure of the regenerative passage 27a between the regenerative control spool valve 26 and the regenerative motor M as a pilot pressure. The failsafe switching valve 160 includes a pilot chamber 160a and a spring 160b elastically support-ing a valve element. Moreover, on a downstream of the proportional electromagnetic valve 34 and on an upstream of a connection portion with the failsafe switching valve 160, a first orifice 161 for narrowing pilot pressure oil supplied from the pilot hydraulic source PP is provided.

The failsafe switching valve 160 has a bleed orifice position 160c for bleeding the pilot pressure oil on the downstream side of the first orifice 161 to the tank T and a bleed shut-off position 160d for supplying the full amount of the pilot pressure oil to the pilot chamber 26a of the regenerative control spool valve 26 when the pressure of the regenerative passage 27 is at a set pressure or more.

When the failsafe switching valve 160 is switched to the bleed orifice position 160c, the failsafe switching valve 160 discharges a part of the pilot pressure oil for supplying the pilot pressure oil supplied through the proportional electromagnetic valve 34 from the pilot hydraulic source PP to the pilot chamber 26a and the pilot chamber 32a through the first orifice 161 to the tank T through a second orifice 162. As described above, the failsafe switching valve 160 forms a bleed circuit in a state switched to the bleed orifice position 160c.

Instead of provision of the second orifice 162 inside the failsafe switching valve 160, it may be provided separately from the failsafe switching valve 160 at an end branching from the pilot passage to which the pilot pressure oil is supplied from the pilot hydraulic source PP.

When the failsafe switching valve 160 is switched to the bleed shut-off position 160d, the failsafe switching valve 160 shuts off a flow of the working oil discharged from the pilot hydraulic source PP to the tank T. Thus, all the pilot pressure oil supplied through the proportional electromagnetic valve 34 is supplied to the pilot chamber 26a and the pilot chamber 32a. However, the pilot pressure oil supplied from the pilot hydraulic source PP at this time is supplied without the pressure being reduced since the bleed circuit is shut off though the passage is narrowed by the first orifice 161.

The failsafe switching valve 160 is switched to the bleed orifice position 160c if the pressure of the regenerative passage 27a is less than the set pressure similarly to the failsafe switching valve 60 and lowers the pressure of the pilot pressure oil to the regenerative control spool valve 26. As a result, the flow rate of the working oil discharged from the piston-side chamber 25 of the boom cylinder BC is narrowed.

According to the above-described second embodiment, the same working effect as that of the first embodiment is exerted and at the same time, since the failsafe switching valve 160 with 2 ports and 2 positions can be used, a cost can be reduced.

Although an embodiment of the present invention has been described, the embodiment is merely one of application examples of the present invention and by no means limits the technical scope of the present invention to a specific configuration of the above-mentioned embodiment.

For example, in the above-described embodiments, the case in which return working oil from the boom cylinder BC is used is described as an example of regeneration using the return working oil from a fluid pressure cylinder. However, instead of the boom cylinder BC, regeneration may be performed by using the return working oil from an arm cylinder for driving an arm or a bucket cylinder for driving a bucket. The arm cylinder and the bucket cylinder hold a load by the rod-side chamber when the switching valves 5 and 16 are at the neutral position in many cases and thus, the rod-side chamber may be used as a load-side pressure chamber.

This application claims priority to Japanese Patent Application No. 2013-213961 filed in the Japanese Patent Office on Oct. 11, 2013, the entire contents of which are incorporated by reference herein.

The invention claimed is:

1. A control system for a hybrid construction machine, comprising:
    a fluid pressure pump configured to supply a working fluid;
    a fluid pressure cylinder configured to extend by supply of the working fluid to a load-side pressure chamber and raise the load, the fluid pressure cylinder being configured to contract by discharge of the working fluid from the load-side pressure chamber and lower the load;
    a regenerative motor for regeneration configured to be rotated by the working fluid discharged from the load-side pressure chamber;
    a regenerative passage, extending between the load-side pressure chamber and the regenerative motor, in which the working fluid from the load-side pressure chamber passes to the regenerative motor;
    a regenerative flow-rate control valve provided between the load-side pressure chamber and the regenerative motor, and being controlled by a first pressure of a pilot fluid, the regenerative flow-rate control valve being configured to adjust a flow rate of the working fluid in a portion of the regenerative passage between the regenerative flow-rate control valve and the regenerative motor;
    a rotary electric machine connected to the regenerative motor; and
    a failsafe switching valve configured to adjust the first pressure for the regenerative flow-rate control valve and being controlled by a second pressure, the second pressure being a pressure of the working fluid flowing through the portion of the regenerative passage between the regenerative flow-rate control valve and the regenerative motor, when the second pressure is less than a set pressure, the failsafe switching valve decreasing the first pressure so that the flow rate of the working fluid in the regenerative passage is decreased.

2. The control system for a hybrid construction machine according to claim 1, wherein
    the failsafe switching valve is configured to discharge a part of the pilot fluid to a tank when the second pressure is less than the set pressure, thereby decreasing the first pressure.

3. The control system for a hybrid construction machine according to claim 1, wherein
    the pilot fluid is supplied to the failsafe switching valve for controlling the regenerative flow-rate control valve,
    the failsafe switching valve is switched to a bleed orifice position at which the failsafe switching valve decreases the first pressure when the second pressure is less than the set pressure, and
    the failsafe switching valve is switched to a communication position at which the failsafe switching valve passes through the pilot fluid without changing the first pressure when the second pressure is at the set pressure or more.

4. The control system for a hybrid construction machine according to claim 2, further comprising:
    an orifice-through which the pilot fluid to be supplied to the regenerative flow-rate control valve passes, wherein
    the failsafe switching valve is provided in a passage branching from a downstream side of the orifice and communicating with the tank.

5. The control system for a hybrid construction machine according to claim 2, further comprising:
    a regeneration flow-rate control valve controlled by the first pressure, and being configured to lead a part of the working fluid led from the load-side pressure chamber to the tank as a regeneration fluid to an anti-load side pressure chamber of the fluid pressure cylinder when the load lowers.

6. The control system for a hybrid construction machine according to claim 3, further comprising:
    a regeneration flow-rate control valve controlled by the first pressure, and being configured to lead a part of the working fluid led from the load-side pressure chamber to the tank as a regeneration fluid to an anti-load side pressure chamber of the fluid pressure cylinder when the load lowers.

7. The control system for a hybrid construction machine according to claim 1, wherein the pilot fluid for controlling the regenerative flow-rate control valve is supplied during an operation of the load being lowered.

* * * * *